United States Patent [19]
Takezawa

[11] Patent Number: 5,392,265
[45] Date of Patent: Feb. 21, 1995

[54] RECORDING AND REPRODUCING APPARATUS WHICH CALCULATES AND DISPLAYS MANAGEMENT INFORMATION OF RECORDED SEGMENTS

[75] Inventor: Masayuki Takezawa, Tokyo, Japan
[73] Assignee: Sony Corporation, Tokyo, Japan
[21] Appl. No.: 62,934
[22] Filed: May 17, 1993
[30] Foreign Application Priority Data
  May 20, 1992 [JP] Japan .................................. 4-151130
[51] Int. Cl.$^6$ .......................................... G11B 17/22
[52] U.S. Cl. ...................................... 369/32; 369/47; 369/54
[58] Field of Search ................. 369/32, 33, 13, 47, 369/48, 49, 54, 124, 53, 58

[56] References Cited
U.S. PATENT DOCUMENTS

| | | | |
|---|---|---|---|
| 4,862,439 | 8/1989 | Ando et al. | 369/32 |
| 4,916,682 | 4/1990 | Tomoda et al. | 369/32 |
| 5,142,521 | 8/1992 | Terashima et al. | 369/32 |
| 5,153,861 | 10/1992 | Maeda et al. | 369/32 |
| 5,214,631 | 5/1993 | Maeda et al. | 369/124 |
| 5,224,087 | 6/1993 | Maeda et al. | 369/124 |
| 5,243,588 | 9/1993 | Maeda et al. | 369/54 |
| 5,274,617 | 12/1993 | Terashima et al. | 369/32 |

FOREIGN PATENT DOCUMENTS
0540164 5/1993 European Pat. Off. ............. 369/13

OTHER PUBLICATIONS

*Mini Disc System Technical Manual*, published Mar. 1992, Sony Corporation, Audio Development Group, Tokyo, Japan.
Ser. No. 08/063,512 Aramaki et al, filed May 18, 1993.

*Primary Examiner*—Robert J. Pascal
*Assistant Examiner*—Tan Dinh
*Attorney, Agent, or Firm*—Limbach & Limbach

[57] ABSTRACT

A recording and/or reproducing apparatus records and/or reproduces a recording medium on which musical information is recorded discretely together with management information for managing the recorded musical information. The apparatus calculates, based on the management information, a playing time of each musical piece, a total playing time of all of the musical pieces recorded on the recording medium, a remaining time for which the recording medium can be further recorded, and a remaining number of musical pieces which can be further recorded onto the recording medium, and displays the result of the calculation.

11 Claims, 7 Drawing Sheets

FIG. 2

| | | 16 BIT | | 16 BIT | | |
|---|---|---|---|---|---|---|
| | MSB  LSB | MSB  LSB | MSB  LSB | MSB  LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTER | CLUSTER | 00000000 | 00000000 | 3 |
| | 00000000 | 00000000 | 00000000 | 00000000 | 4 |
| | 00000000 | 00000000 | 00000000 | 00000000 | 5 |
| | | | | | 6 |
| | | | FIRST TNO | LAST TNO | 7 |
| | | | | USED SECTORS | 8 |
| | | | | | 9 |
| | | | | | 10 |
| | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| MANAGEMENT TABLE (255 PART TABLES) | (01) START ADDRESS | | | TRACK MODE | 78 |
| | END ADDRESS | | | LINK INFORMATION | 79 |
| | (02) START ADDRESS | | | TRACK MODE | 80 |
| | END ADDRESS | | | LINK INFORMATION | 81 |
| | (03) START ADDRESS | | | TRACK MODE | 82 |
| | END ADDRESS | | | LINK INFORMATION | 83 |
| | (FC) START ADDRESS | | | TRACK MODE | 500 |
| | END ADDRESS | | | LINK INFORMATION | 581 |
| | (FD) START ADDRESS | | | TRACK MODE | 582 |
| | END ADDRESS | | | LINK INFORMATION | 583 |
| | (FE) START ADDRESS | | | TRACK MODE | 584 |
| | END ADDRESS | | | LINK INFORMATION | 585 |
| | (FF) START ADDRESS | | | TRACK MODE | 586 |
| | END ADDRESS | | | LINK INFORMATION | 587 |

RECORDING AND REPRODUCING APPARATUS WHICH CALCULATES AND DISPLAYS MANAGEMENT INFORMATION OF RECORDED SEGMENTS

BACKGROUND OF THE INVENTION

1. Field of the Invention

The present invention relates to a recording and/or reproducing apparatus. More particularly, the present invention relates to a recording and/or reproducing apparatus which can record and/or reproduce data of a program such as a musical piece onto or from a recording medium such as a disc.

2. Description of the Related Art

A compact disc (CD), which is an exemplary one of conventionally known optical discs, has recorded on an inner circumference side thereof information of contents of the disc called TOC (table of contents) data.

The contents information includes the number of musical pieces recorded on the disc, a total playing time and playing times of the individual musical pieces. A recording and/or reproducing apparatus wherein an elapsed time, a remaining time and a remaining number of musical pieces obtained from such contents information are displayed on a display unit is already known and disclosed, for example, in Japanese Laid-Open Utility Model Gazette No. 63 113289.

Also a recordable optical disc wherein an accumulated recording time is recorded in a user TOC (table of contents) area is already known and disclosed, for example, in U.S. Pat. No. 5,111,442.

Another recordable disc wherein a recordable area thereon can be calculated from the TOC information thereon is already known and disclosed, for example, in U.S. Pat. No. 4,862,439.

Recordable disc-shaped media such as, for example, magneto-optical discs provide random accessing compared with tape-formed recording media such as digital audio tapes and compact cassette tapes.

Accordingly, for example, a program need not necessarily be recorded on a continuous segment of a recordable disc medium but may be recorded discretely on a plurality of segments on the disc. In this instance, if the read-in transfer rate of the reproduction data of the disc is raised and the reproduction data is reproduced after it is stored once into a RAM (random access memory), then the data can be reproduced without trouble. It is to be noted that a segment herein denotes a portion of a track in which data is recorded physically and continuously on a disc.

In short, when segment data recorded at positions spaced from each other on a disc are to be linked, if it is possible to access the position at which the segment data to follow the preceding segment data is recorded, at such a high rate that, while the preceding segment data is read out from the RAM, accessing to the following segment data is completed to prepare for reproduction of the following segment data, there is no trouble in recording/reproduction of data even if a track of one program is physically divided into a plurality of discrete segments. A recording and/or reproducing apparatus wherein the transfer rate at which data is read out is sufficiently high and data thus read out is stored once into a RAM and then read out from the RAM at an ordinary read-out rate is disclosed, for example, in U.S. patent application Ser. No. 717,700, filed Jun. 19, 1991.

A disc on which data are recorded discretely is illustratively shown in FIG. 7. Referring to FIG. 7, data of a first musical piece and data of a second musical piece are recorded continuously on a segment T1 and another segment T2, respectively. However, it is otherwise possible to record data of a musical piece separately on discontinuous segments on a track in such a manner that data of fourth and fifth programs are recorded divisionally on discontinuous segments T4(1) to T4(4) and T5(1) to T5(2), respectively, as shown in FIG. 7. It is to be noted that FIG. 7 shows the disc only in a schematic fashion, and actually, in most cases one segment is recorded spirally over several to several hundreds circumferences.

When recording or erasure of a program onto or from a magneto-optical disc is repeated, empty areas are produced irregularly on tracks of the disc due to a difference between playing times of recorded programs or between playing times of erased programs. However, if such discrete recording is performed, then it is possible to record, for example, a program longer than another program erased from the disc onto the disc making use of the portion from which the program has been erased. Consequently, it can be prevented that a useless data recording area is produced by a repetition of recording and/or erasure. It is to be noted that, in the present specification, a mass of data continuous in contents is represented as "program". Here, the program is not limited to musical information but may include any audio signals.

In a disc medium of the type described above, in order to allow random accessing, data for linking segments (for example, T4(1) to T4(4) in FIG. 7) of a program are stored as user TOC information which is rewritten each time a recording operation or an erasing operation is performed. Thus, a recording and/or reproducing apparatus is controlled so as to read the user TOC information and perform accessing of a head to achieve an appropriate recording and/or recording operation. An exemplary one of signal recording and/or reproducing apparatus of the type just described is disclosed in U.S. patent application Ser. No. 945,488, filed Sep. 16, 1992.

By the way, in a recording medium in the form of a disc which allows recording of a program or the like thereon by a user, it is convenient if the remaining time available for recording and the number of recordable programs by a user, a playing time of each program recorded on the disc and so forth are calculated and displayed on a display unit.

However, since a track is not always recorded continuously (in short, in one segment), there is a problem in that the recording time from a last one of the already recorded tracks to a last one of recordable tracks cannot be determined merely as a recordable remaining time.

SUMMARY OF THE INVENTION

It is an object of the present invention to provide a recording and/or reproducing apparatus which resolves the above mentioned problems.

It is another object of the present invention to provide a recording and/or reproducing apparatus wherein a recordable remaining time, a recordable number of programs and a playing time of each program recorded on a recording medium can be calculated readily using data which are recorded in a user TOC area of the recording medium as access information for recording and reproduction of data.

It is further object of the present invention to provide a time information calculating method for a recording medium which resolves above mentioned problems.

According to the present invention, a reproducing and/or recording apparatus is used to reproduce and/or record a recording medium which may have a plurality of recorded and/or recordable areas each constituted from a single continuous segment or a plurality of discrete segments and has recorded thereon a management table including a plurality of part tables each of which has a start address and an end address of a segment on the recording medium and link information indicative of another segment to be linked and a corresponding table indicating data indicating an absolute position of one of the part tables on the management table. The reproducing and/or recording apparatus comprises data read-out means for reading out the data recorded on the recording medium, storage means for storing therein the management table data read out by the data read-out means, calculation means for performing calculating processing in accordance with the management table data stored in the storage means to obtain particular information, and display means for displaying thereon the particular information from the calculation means.

When the corresponding table-indicating data indicate an absolute position of one of the part tables for a particular program and the calculation means calculates, in accordance with the management table data stored in the storage means, a sum total of data lengths of segments indicated by all of those part tables successively linked in accordance with the link information beginning with the part table indicated by the corresponding table indicating data and converts the total value obtained by the calculation into time information, the time information obtained from the calculation means represents the total playing time of the program and is displayed on the display means.

When the corresponding table-indicating data is provided for each of the programs recorded on the recording medium and indicate an absolute position of the corresponding part table and the calculation means calculates, in accordance with the management table data stored in the storage means, a sum total of data lengths of segments indicated by all of those part tables successively linked in accordance with the link information beginning with the art table indicated by each of the corresponding table indicating data, adds all of the total values of data lengths calculated for the individual program data and converts the sum value obtained by the addition into time information, the time information represents the total playing time of all of the programs recorded on the recording medium and is displayed on the display means.

When the corresponding table-indicating data indicates an absolute position of one of the part tables in the recordable areas on the management table and the calculation means calculates, in accordance with the management table data stored in the storage means, a sum total of data lengths of segments indicated by all of those part tables successively linked in accordance with the link information beginning with the part table indicated by the corresponding table indicating data and converts the total value obtained by the calculation into time information, the time information represents the recordable remaining time of the recording medium and is displayed on the display means.

When the part table indicating data are provided for recordable areas and indicate absolute positions of the part tables on the management table and the calculation means counts, in accordance with the management table data stored in the storage means, the number of all of those part tables successively linked in accordance with the link information individually beginning with the part tables indicated by the part (corresponding) table indicating data and converts the number obtained by the counting into time information, the number obtained represents the number of recordable areas or programs and is displayed on the display means.

In the reproducing and/or recording apparatus, since the part tables each having a start address and an end address as well as link information are read out from the recording medium and stored into the storage means so as to be used later by the calculation means, if the link information is determined so as to link another part table for a segment which has a common feature (that the segment is an unrecorded segment or one of segments of a recorded program) and is to be reproduced subsequently in time and the corresponding table indicating data are determined so as to indicate a first one of the thus linked part tables, then the calculation means can calculate the playing time of a particular program, the total playing time of the programs recorded on the recording medium or the number of recordable programs. In short, since the data length of a segment can be calculated from the difference of the start address from the end address, the data length of the linked part tables can be calculated by adding the data lengths.

Further, where the management system described above is adopted, since the number of recordable programs is limited by the number of part tables prepared in the management table, the number of programs can be determined by counting the number of part tables for the recordable segments.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a table showing the structure of data of user TOC information to be read into the recording and/or reproducing apparatus of FIG. 1.

DESCRIPTION OF THE INVENTION

Figure 1:
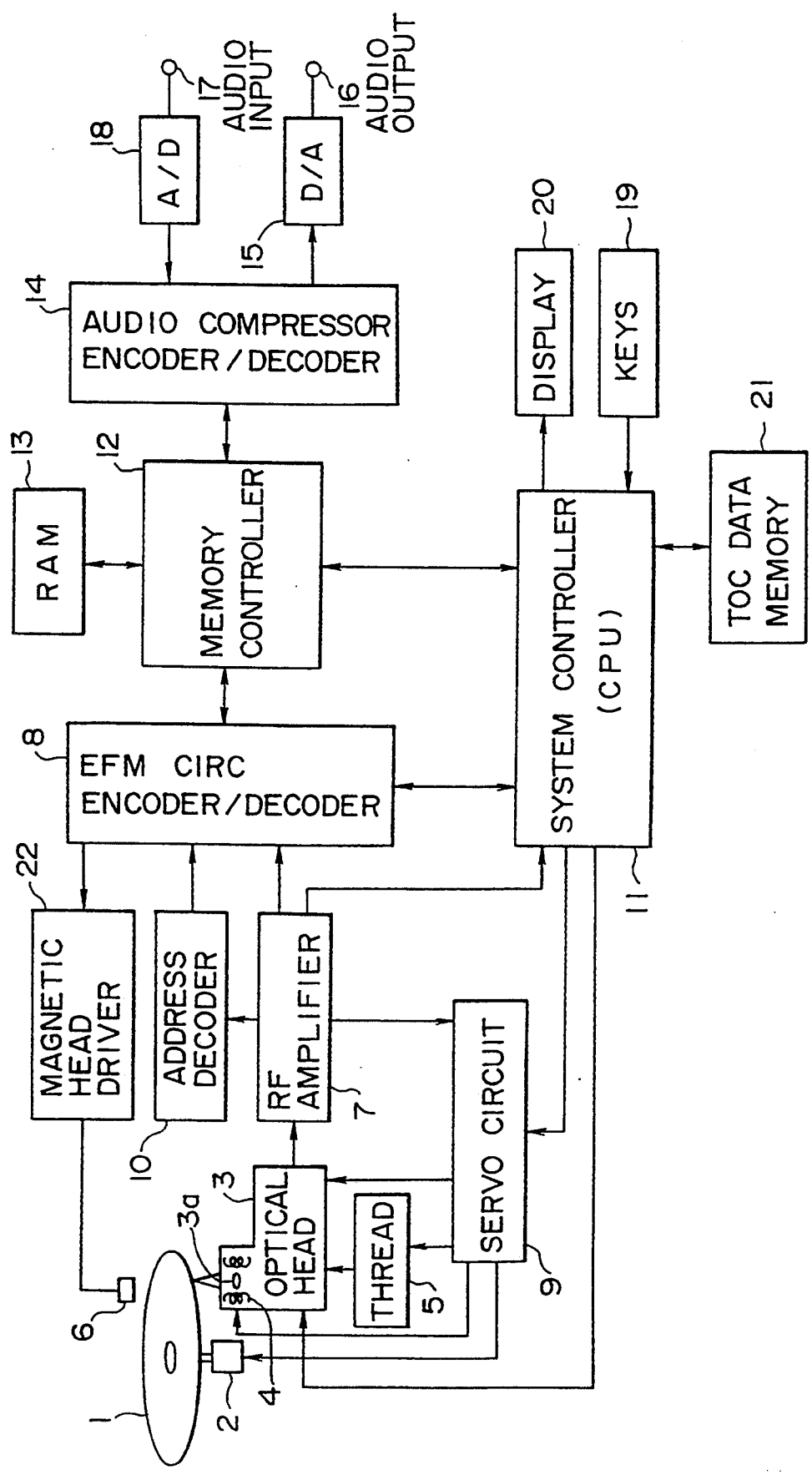
FIG. 1 is a block diagram of a recording and/or reproducing apparatus showing a preferred embodiment of the present invention.

Referring first to FIG. 1, there is shown a construction of a recording and reproducing apparatus to which the present invention is applied. The recording and reproducing apparatus shown employs a magneto-optical disc as a recording medium. The magneto-optical disc is generally denoted at 1 and has a plurality of programs (audio data) recorded thereon. The magneto-optical disc 1 is driven to rotate by a spindle motor 2. An optical head 3 irradiates a laser beam upon the magneto-optical disc 1 to perform recording or reproduction. In particular, upon recording, the optical head 3 outputs a laser beam of a high level to heat a recording track to a temperature higher than the Curie temperature of the magneto-optical disc 1, but upon reproduction, the optical head 3 outputs a laser beam of a comparatively low power level for detecting data from reflected light based on a magnetic Kerr effect.

To this end, though not shown, the optical head 3 carries thereon an optical system including a laser diode serving as laser outputting means, a polarizing beam splitter, an objective lens and some other optical elements, and a detector for detecting reflected light. The objective lens 3a is carried for displacement in a radial direction of the disc 1 and in a perpendicular direction toward and away from the disc 1 by a biaxial mechanism 4, and the entire optical head 3 is mounted for movement in a radial direction of the disc 1 by a thread mechanism 5.

A magnetic head 6 is disposed in an opposing relationship to the optical head 3 with the magneto-optical disc 1 interposed therebetween and applies a magnetic field modulated in accordance with data supplied thereto to the magneto-optical disc 1.

Upon reproducing operation, information detected from the magneto-optical disc 1 by the optical head 3 is supplied to an RF (radio frequency) amplifier 7. The RF amplifier 7 executes calculation processing of the information supplied thereto to extract a reproduction RF signal, a tracking error signal, a focusing error signal, absolute position information (information of an absolute position recorded as a pre-group (wobbling group) on the magneto-optical disc 1), address information, sub-code information, a focus monitor signal and so forth. The thus extracted reproduction RF signal is supplied to an encoder/decoder section 8. Meanwhile, the tracking error signal and the focusing error signal are supplied to a servo circuit 9, and the address information is supplied to an address decoder 10. Further, the absolute position information and the focusing monitor signal are supplied to a system controller 11 which may be constituted, for example, from a microcomputer.

The servo circuit 9 generates various servo driving signals in response to the tracking error signal and the focusing error signal supplied thereto from the RF amplifier 7 and also to a track jumping instruction, a seeking instruction, rotational speed detection information and so forth supplied thereto from the system controller 11 to control the biaxial mechanism 4 and the thread mechanism 5 to effect focusing and tracking control and to control the spindle motor 2 to rotate at a constant angular velocity (CAV) or a constant linear velocity (CLV).

The reproduction RF signal is processed by decoding processing such as EFM demodulation (eight-fourteen demodulation) or CIRC (cross interleaved Reed-Solomon code) by the encoder/decoder section 8, and then written once into a buffer RAM (random access memory) 13 by a memory controller 12. It is to be noted that reading of data from the magneto-optical disc 1 by the optical head 3 and transfer of reproduction data from the optical head 3 up to the buffer RAM 13 is performed at the rate of 1.41 Mbit/sec.

The data written in the buffer RAM 13 are read out at the reproduction data transfer rate of 0.3 Mbit/sec and supplied to the encoder/decoder section 14, at which they are subsequently processed by reproduction signal processing such as decoding processing against audio compressing processing. The data are then converted into an analog signal by a digital to analog (D/A) converter 15 and supplied from a terminal 16 to a predetermined amplifier circuit, from which it is outputted to the outside, for example, as L- and R-channel audio signals.

Meanwhile, the address information outputted from the address decoder 10 is supplied to the system controller 11 by way of the encoder/decoder section 8 so as to be used for various controlling operations.

Also, a locking detection signal of a PLL (phase locked loop) circuit for generating a bit clock signal for a recording and/or reproducing operation and a monitor signal representative of a missing condition of a frame synchronizing signal of the reproduction data (L- and R-channels) are supplied to the system controller 11.

When a recording operation is to be performed onto the magneto-optical disc 1, a recording signal (analog audio signal) supplied to the terminal 17 is converted into digital data by an analog to digital (A/D) converter 18 and then supplied to the encoder/decoder section 14, at which audio compressing encoding processing is applied to them. The recording data compressed by the encoder/decoder section 14 are written once into the buffer RAM 13 by the memory controller 12 and then read out and sent at predetermined timings to the encoder/decoder section 8. Then, the recording data are processed by encoding processing such as CIRC encoding or EFM modulation at the encoder/decoder section 8 and then supplied to a magnetic head driving circuit 22.

The magnetic head driving circuit 22 supplies a magnetic head driving signal to the magnetic head 6 in response to the recording data to which the encoding processing has been applied. In short, a magnetic field of the north or south pole is applied from the magnetic head 6 to the magneto-optical disc 1. Meanwhile, the system controller 11 supplies a controlling signal to the optical head 3 so as to output laser light at the predetermined recording level.

The recording and reproducing apparatus further includes a manually operable inputting section 19 on which manually operable keys are provided, and a display section 20 constituted, for example, from a liquid crystal display unit. The manually operable keys of the manually operable inputting section 19 include a reproduction key, a stopping key, an AMS (automatic music sensor) key for selection of a program, a search key and so forth.

The recording and reproducing apparatus further includes a RAM (hereinafter referred to as TOC memory) 21 for storing therein TOC (table of contents) information of the magneto-optical disc 1. Either at the point of time when the magneto-optical disc 1 is loaded in position or immediately before a recording or reproducing operation, the system controller 11 activates the spindle motor 2 and the optical head 3 so as to extract data of a TOC area which is set, for example, on the innermost circumference side of the magneto-optical disc 1. Then, the TOC information thus extracted is supplied by way of the RF amplifier 7 and the encoder/decoder section 8 to the system controller 11, at which it is subsequently stored into the TOC memory 21 so that it can thereafter be used for control of a recording and/or reproducing operation onto and/or from the magneto-optical disc 1.

Particularly in a recordable disc-shaped medium, segment management data for allowing a program to be recorded onto and/or reproduced from a segment or a plurality of divisional segments are recorded. In short, a recordable disc medium has a user TOC area whose contents are rewritten by recording or erasure of data for management of recording data areas. The user TOC area has, for example, such a data structure as illustrated in FIG. 2.

Referring to FIG. 2, the user TOC data area is constructed as 4 bytes×587 data areas, each of which has, in order to indicate that it is a user TOC area, at the head position thereof, a header having a synchronizing pattern formed from one byte data of all 0 or all 1.

Further, data of the program number (First Track Number) of a first one of programs recorded on the magneto-optical disc, the program number (Last Track Number) of a last program, a situation of use of sectors, a disc identification code (ID) and so forth are recorded at predetermined address positions of the magneto-optical disc. Further, areas into which various corresponding table indicating data (P-DFA to P-TNO255) which establish a corresponding relationship between the programs recorded on the magneto-optical disc and management tables which will be hereinafter described.

Meanwhile, a total of 255 part tables (01) to (FF) are provided as management tables, and a start address indicative of a starting point of a certain segment, an end address indicative of an end point of the segment, mode information of the segment (track), and, when the segment is subsequently liked to a different segment, link information indicative of a part table in which a start address and an end address of the different segment are recorded can be recorded into each of the part tables.

The mode information of a track includes information whether or not the track is set, for example, to overwrite inhibition or data reproduction inhibition, information whether or not information recorded on the track is audio information, information of distinction between monaural and stereo, and so forth. The link information designates a part table to be linked by the number (01) to (FF) allocated to the part table.

In short, one part table of the management tables represents one segment, and in the case of a program which is constituted, for example, from three segments linked to each other, the management of the positions of the segments is performed based on three part tables which are linked to each other by link information of them. It is to be noted that the numbers (01) to (FF) of the part tables can be used as they are as segment numbers.

Contents of segments of each of the part tables (01) to (FF) of the management tables are indicated by corresponding table indicating data (P-DFA to P-TNO255).

The corresponding table indicating data P-DFA (pointer for defective area) indicate data regarding a defective area or areas on the magneto-optical disc 1 and designate a part table or a head one of a plurality of part tables in which a track or tracks (segment or segments) which makes or make a defective area or areas by damage or by some other cause are indicated. In short, when a defective segment is present on the disc, one of the numbers (01) to (FF)-corresponding to it is indicated by the corresponding table indicating data P-DFA, and in a part table of the number, the defective segment is indicated by start and end addresses thereof. Further, when some other defective segments are present, another part table corresponding to a first one of them is designated by the link information in the part table for the first defective segment, and a further defective segment is indicated in the part table for the second defective segment. Then, when there is no other defective segment present, the link information represents, for example, "(00)", which indicates that there is no segment to be linked there.

Data P-EMPTY (pointer for empty) represent a part table or a first one of a plurality of part tables of the management tables which have not been used as yet. When an unused part table is present, one of the numbers (00) to (FF) is recorded as the corresponding table indicating data P-EMPTY. Note that these numbers are provided in hexadecimal notation. When a plurality of unused part tables are present, the part tables are designated successively by the link information beginning with a part table designated by the corresponding table indicating data P-EMPTY so that all of the unused part tables are linked on the management tables.

For example, when the magneto-optical disc has no information recorded thereon and has no defect thereon, since no part table is used, for example, the part table (01) is designated by the corresponding table indicating data P-EMPTY; the part table (02) is designated by the link information of the part table (01); the part table (03) is designated by the link information of the part table (02); and all of the part tables up to the part table (FF) are linked in this manner. In this instance, the link information of the part table (FF) is set to "(00)" which represents that there is no part table to be linked there.

Data P-FRA (pointer for freely recordable area) indicate data for a non-recorded data area or areas (including an erased area or areas) on the magneto-optical disc 1 and designate a part table or a first one of a plurality of part tables in which a track (=segment) which makes a recordable area is indicated. In short, when a recordable area is present, one of the numbers (01) to (FF) is recorded in the corresponding table indicating data P-FRA, and a segment which is a recordable area is indicated by start and end addresses in a part table corresponding to the number of the unused recording area. Further, when a plurality of such segments are present, in short, when a plurality of part tables are present, the part tables are designated successively up to the part table whose link information is "(00)" in a similar manner.

Figure 3:
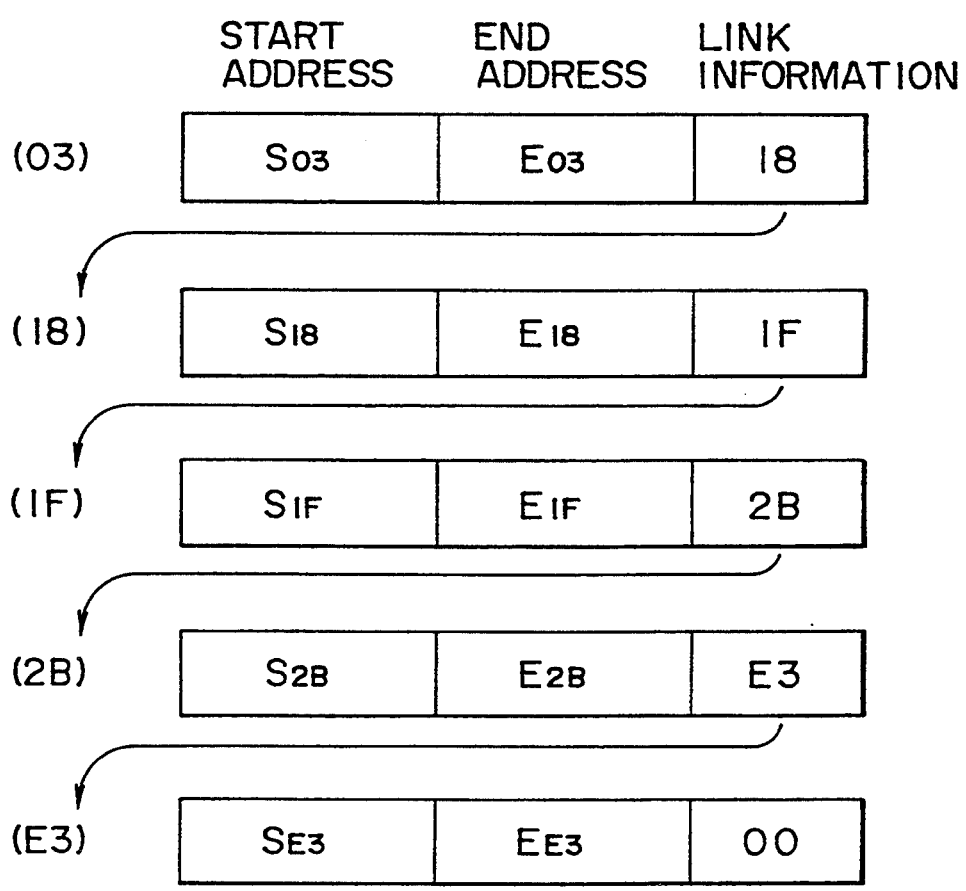
FIG. 3 is a diagrammatic view illustrating a linking condition and a total data length calculating operation based on corresponding table indicating data and a part table in the recording and/or reproducing apparatus of FIG. 1.

FIG. 3 diagrammatically illustrates a form of management of segments as recordable areas based on the part tables. Referring to FIG. 3, when the segments (03), (18), (1F), (2B) and (E3) are recordable areas, the condition of the recordable areas is represented by a link of the part tables (03), (18), (1F), (2B) and (E3) following the corresponding table indicating data P-FRA. It is to be noted that also the form of management of defective areas or of unused part tables described above is similar to this.

The data P-TNO1 to P-TNO255 indicate data for programs recorded on the magneto-optical disc 1, and for example, the corresponding table indicating data P-TNO1 designate a part table in which a segment on which data of the first program are recorded or one of a plurality of segments, on which data of the first program are recorded, that is to appear first in time is indicated.

For example, when a first program is recorded on a continuous track, that is, on one segment of the magneto-optical disc, a recording area of the first program is recorded as start and end addresses of a part table indicated by the corresponding table indicating data P-TNO1.

Meanwhile, when a second program is recorded discretely on a plurality of segments of the disc, the segments are designated in order of time in order to indicate the recording positions of the program. In short, from a part table designated by the corresponding table indicating data P-TNO2, the other part tables are designated successively in order of time by the link information ending with the part table wherein the link information is "(00)" (in a similar form as in FIG. 3). Since all of the segments on which data constituting, for example, the second program are recorded are successively designated and recorded on the magneto-optical disc in this manner, upon reproduction of the second program or when overwriting into the areas of the second program is to be performed, it is possible to cause, using the user TOC data, the optical head 3 and the magnetic head 6 to access the areas of the second program to extract continuous musical information from the discrete segments or to perform recording using the recording areas efficiently.

The recording and reproducing apparatus of the present embodiment for a magneto-optical disc 1 on which such user TOC data are recorded not only performs management of the recording areas on the disc 1 using the user TOC data read in the TOC memory 21 to control a recording operation but also can calculate a recordable remaining time, a recordable remaining program number and a playing time of each recorded program using the user TOC data and display the calculated values on the display section 20 so that the user can know them. The calculation operations will be described successively below.

<Recordable Remaining Time Calculation Operation>

Figure 4:
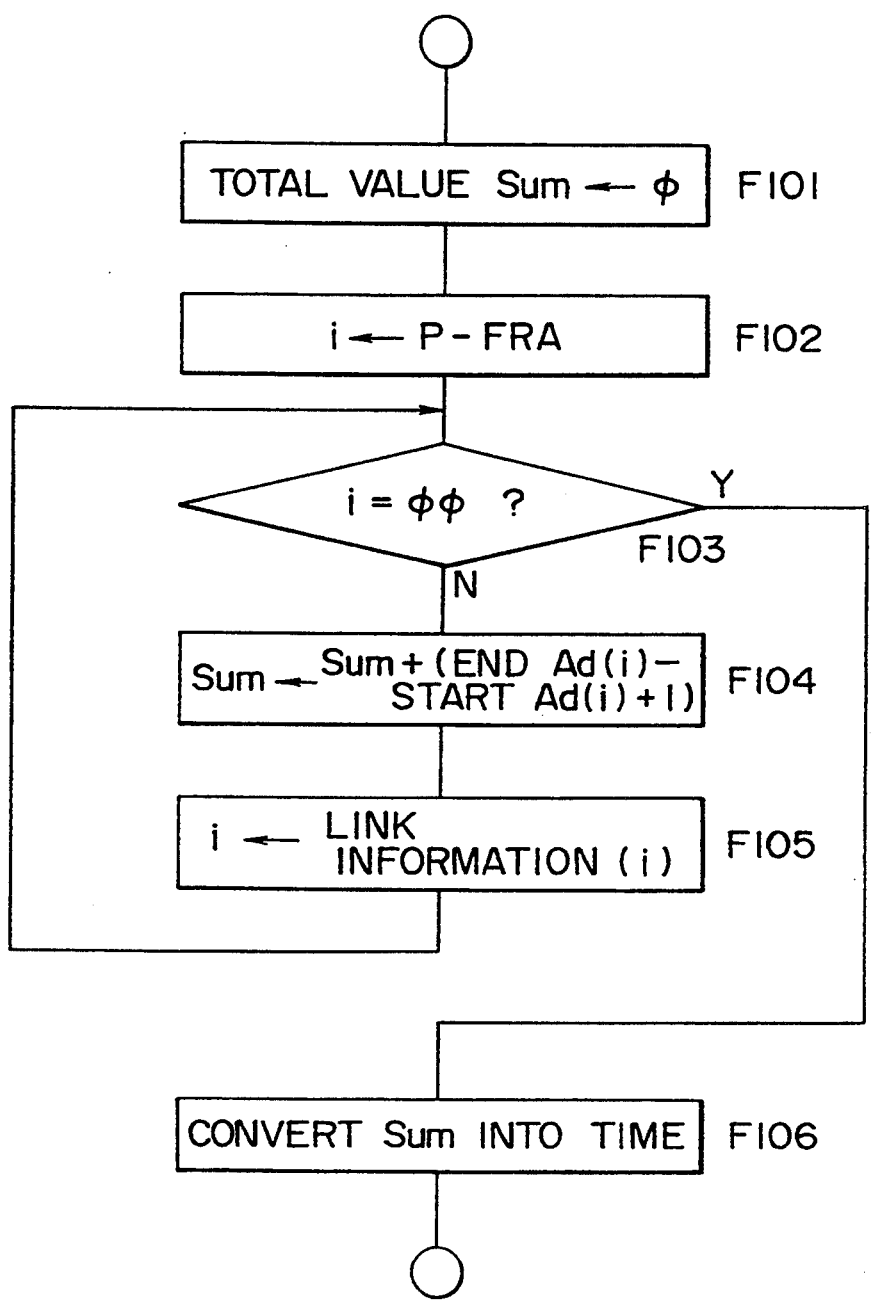
FIG. 4 is a flow chart illustrating an operation of calculating a recordable remaining time in the recording and/or reproducing apparatus of FIG. 1.

FIG. 4 illustrates the operation of calculating the recordable remaining time of the magneto-optical disc 1. It is to be noted that reference characters F101 to F106 in FIG. 4 denote different operation steps.

After the magneto-optical disc 1 is loaded in position, the TOC information thereof is read in. Consequently, the user TOC data illustrated in FIG. 2 are stored into the TOC memory 21. Thus, for example, if the user manually operates the manually operable inputting section 19 to input an instruction to cause a recordable remaining time to be displayed, or at a predetermined time, the system controller 11 automatically executes processing of the routine of FIG. 4 using the user TOC data.

First, a variable Sum representative of a total value is prepared and reset to its initial value 0 (F101). Then, the system controller 11 reads out data recorded in the corresponding table indicating data P-FRA and sets them as a variable i (F102). Here, if i=(00), then this means that there is no empty area on the disc 1 and the recordable remaining time is zero (F103 F106).

On the other hand, when a particular part table (for example, (03)) is designated by the corresponding table indicating data P-FRA, for example, as shown in FIG. 3 (F103 F104), a data length of a segment recorded in the particular part table is calculated and added to the variable Sum (F104). In this instance, the data length of the segment is given as a sum of a difference of the end address from the start address and an address value "1".

Subsequently, the link information in the particular part table is placed into the variable i (F105), and then the variable i is checked (F103). If the disc 1 then has a plurality of segments which make empty areas, then the variable i is not (00) but indicates some other part table.

Thus, a data length of a segment indicated by a part table linked in accordance with the variable i is added to the variable Sum (F103, F104). In short, data lengths of segments indicated by part tables are all added to the variable Sum until a part table whose link information is (00) is reached. Then, when the variable i=(00) is found out, the sum total of the data lengths of the empty data areas, which is held as the variable Sum, is converted into a time (F106). The value thus obtained by the conversion represents the recordable remaining time of the disc 1, and the system controller 11 displays the value on the display section 20 so as to be observed by the user.

In short, by the processing described above, for example, in the case illustrated in FIG. 3, the data lengths of the part tables (18), (1F), (2B) and (E3) which are connected successively with the link information beginning with the part table (03) designated by the corresponding table indicating table P-FRA and indicating an empty segment and individually indicate empty segments are summed totally. In short, the amount (time) of the recordable areas existing discretely on the disc 1 can be calculated readily and accurately. The user can thus use this as a guide for a recording operation. Further, the value obtained is used for management of the recording operation of the system itself.

<Recordable Remaining Program. Number Calculation Operation>

Figure 5:
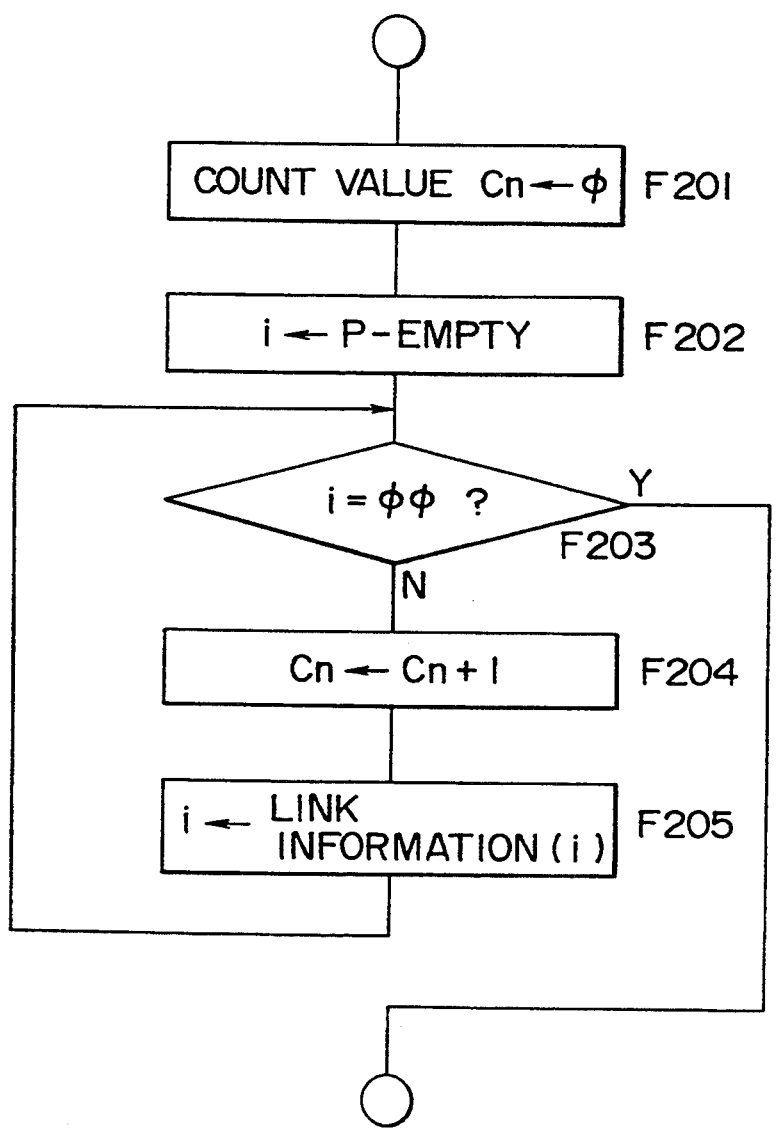
FIG. 5 is a flow chart illustrating an operation of calculating a recordable remaining program number in the recording and/or reproducing apparatus of FIG. 1.

FIG. 5 illustrates the operation of calculating the recordable remaining program number of the magneto-optical disc 1. It is to be noted that reference characters F201 to F205 in FIG. 5 denote different operation steps.

Since the recording data areas of the disc 1 are managed with such user TOC data as described above, the total number of programs which can be recorded on the magneto-optical disc 1 is fundamentally limited to the number of the corresponding table indicating data P-TNOn. In this instance, since P-TNO1 to P-TNO255 are prepared, the upper limit to the total number of programs is 255. However, since one program may be recorded divisionally on a plurality of segments, in short, since a plurality of part tables may be used for one program for management, actually the number of recordable programs is limited by the number of part tables in the management table. In other words, the number of unused part tables can be grasped as a number of recordable programs then (even if the disc 1 has a sufficient recording capacity, a greater number of programs cannot be recorded after all since all of them cannot be managed).

Thus, the system controller 11 automatically executes the processing of the routine of FIG. 5 using the user TOC data of the magneto-optical disc 1 at a point of time when the user manually operates the manually operable inputting section 19 to input an instruction to cause a recordable remaining program number to be displayed or at a predetermined preset point of time.

First, the count value Cn is reset to its initial value 0 (F201), and then data recorded in the corresponding table indicating data P-EMPTY are read out and set as a variable i (F202). Here, if i=(00), then this means that the disc 1 has no unused part table and the number of recordable remaining program number is zero (F203→F206). On the contrary if i≠(00), then the count value Cn is incremented by one (F204), and the link information in a part table designated by the variable i is placed into the variable i (F205). Then, the variable i is checked again (F203).

By the loop, unused part tables liked with the link information are traced successively, and the number of such part tables is counted. Then, the processing of the loop is completed with the end (i=(00)) of the link. The count value Cn then corresponds to the recordable remaining program number, and the system controller 11 displays the count value Cn on the display section 20 so as to be observed by the user. The user can confirm the display and uses it as a guide for operation such as recording. Further, the value is used also for management of the recording operation of the system itself.

<Program Playing Time Calculation Operation>

Figure 6:
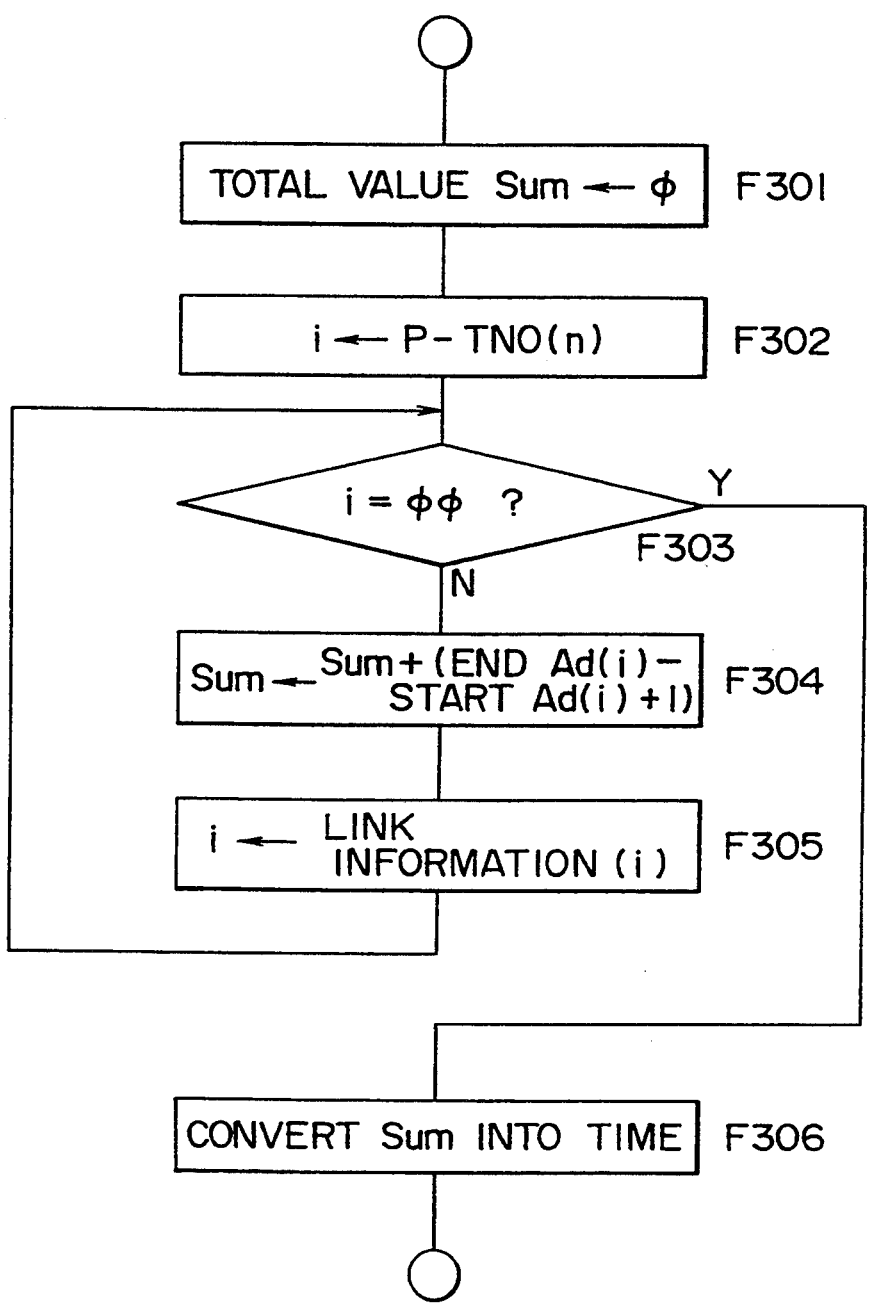
FIG. 6 is a flow chart illustrating an operation of calculating a playing time of a recorded program in the recording and/or reproducing apparatus of FIG. 1.
Figure 7:
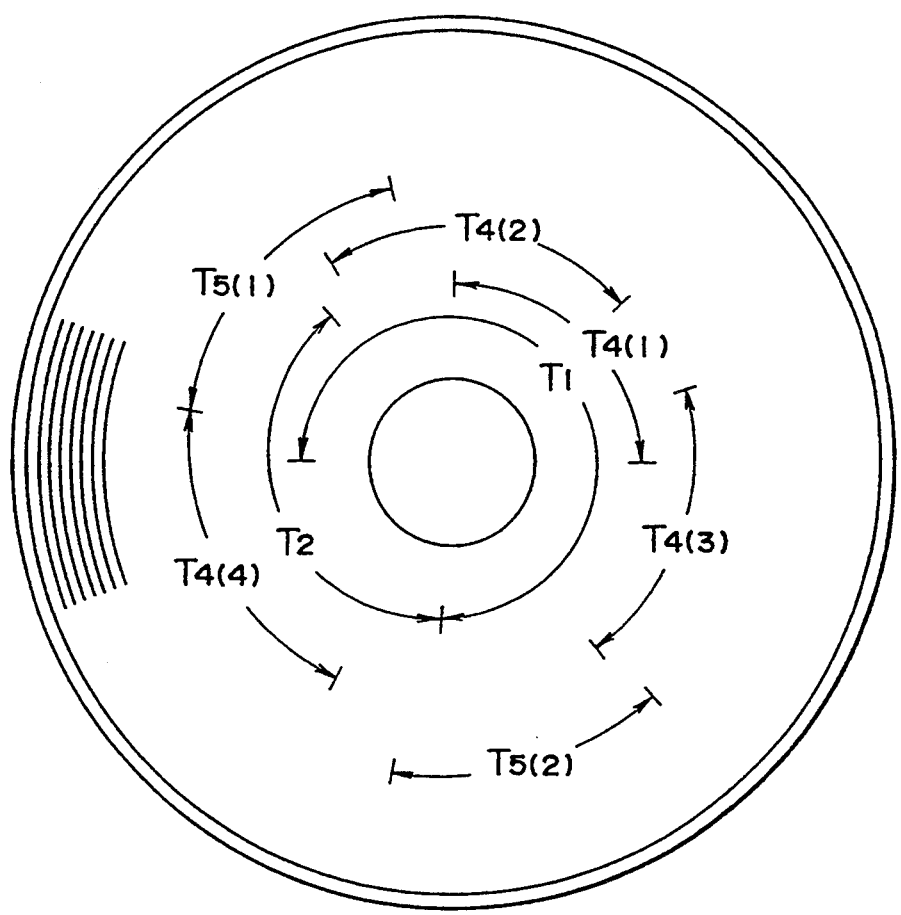
FIG. 7 is a diagrammatic view showing a disc medium on which a program can be recorded on discrete segments.

FIG. 6 illustrates the operation of calculating the playing time of each program recorded on the magneto-optical disc 1, and reference characters F301 to F306 in FIG. 6 denote different operation steps.

For example, when the user manually operates the manually operable inputting section 19 to input an instruction to cause a playing time of a particular program, the system controller 11 executes processing of the routine of FIG. 6 for the particular program or all of the programs recorded on the magneto-optical disc 1 at a predetermined point of time using the user TOC data in order to allow the playing time of the particular program to be displayed.

First, a variable Sum representative of a total value is reset to its initial value 0 (F301). Then, the system controller 11 reads out data recorded in a corresponding table indicating data P-TNO(n) and sets them as a variable i (F302). Here, when the playing time of, for example, the program number 3 is to be calculated, data of the corresponding table indicating data P-TNO3 are placed into the variable i. Here, if i=(00), then this means that there is no program corresponding to the program number 3 present on the disc 1, and the playing time is zero (F103→F106).

But when the data of the corresponding table indicating data P-TNO(n) are not (00), a data length of a segment represented in a part table designated by the data is calculated and added to the variable Sum (F304). In this instance, the data length of the segment is given as a sum of a difference of the end address from the start address and an address value "1". Subsequently, the link information in the part table is placed into the variable i (F305), and then the variable i is checked (F303). If the program is recorded across a plurality of segments, then the variable is not (00) but indicates another part table.

Thus, a data length of a segment indicated by a part table linked with the variable i is added to the variable Sum similarly (F303, F304). In short, data lengths of segments indicated by part tables are all added to the variable sum until a part table whose link information is (00) is reached. Then, when the variable i=(00) is found out, the sum total of the data lengths of the empty data areas, which is held as the variable Sum, is converted into a time (F306). The value of the variable Sum represents nothing but the data length of the program, and accordingly, the value obtained by the conversion represents the playing time of the program. The system controller 11 displays the value on the display section 20 so as to be observed by the user.

By the processing described above, the playing time of a program, for example, recorded by the user can be calculated accurately and displayed so as to be observed by the user.

It is to be noted that, since the user TOC data are rewritten each time a recording or erasing operation of data is performed, preferably each of the calculation operations described above is executed every time at a point of time at which the result of the calculation is to be indicated to the user.

It is further to be noted that, while the present invention is applied to a recording and reproducing apparatus in the embodiment described above, it may be applied otherwise to a recording apparatus or a reproducing apparatus for exclusive use. Further, the present invention can be applied to a reproducing apparatus which need not necessarily cope with a magneto-optical disc but may cope with any recordable optical disc.

Having now fully described the invention, it will be apparent to one of ordinary skill in the art that many changes and modifications can be made thereto without departing from the spirit and scope of the invention as set forth herein.

What is claimed is:

1. A reproducing and recording apparatus for reproducing and recording data on a recording medium which has a plurality of recorded and recordable areas The data being recorded as data segments each constituted from a single continuous segment or a plurality of discrete segments and the recording medium has recorded thereon a management table including a plurality of part tables each of which has a start address and an end address of a segment on the recording medium and link information indicative of another segment to be linked and a corresponding table indicating data indicating an absolute position of one of the part tables on the management table, said apparatus comprising:

data read-out means for reading out the management table data on the recording medium;
   storage means for storing therein the management table data read out by said read-out means;
   calculation means for successively tracing the link information of the management table data stored in said storage means and for calculating the time duration of each recorded segment; and
   display means for displaying the time of each recorded segment based on a result of the calculation by said calculation means.

2. A reproducing and recording apparatus for reproducing and recording data on a recording medium which has recorded thereon program data each of which is recorded as a single continuous segment or a plurality of discrete segments and a management table for managing the program data, the management table including a plurality of part tables each of which has a start address and an end address of a segment on the recording medium and link information indicative of another segment to be linked and a corresponding table indicating data indicating an absolute position of one of the part tables, said apparatus comprising:

data read-out means for reading out the data recorded on the recording medium;

storage means for storing therein the management table data read out by said data read-out means;

calculation means for calculating, in accordance with the management table data stored in said storage means, a sum total of data lengths of the segments indicated by all of those part tables successively linked in accordance with the link information beginning with the part table indicated by the data in the corresponding table and for converting the total value obtained by the calculation into time information indicative of the total time duration of all recorded segments; and display means for displaying thereon the total time duration information from said calculation means.

3. A time information calculating method for a recording medium having at least one recordable area, at least one recorded area and a management area, the recordable area and the recorded area being constituted as a single continuous segment or a plurality of separated segments, the management table including a plurality of part tables and data indicating absolute address data of the head part table in the plurality of part tables, the plurality of part tables having start address data of the segment, end address data of the segment and link data indicating the next segment which is linked to the precedent segment, the method comprising the steps of:

subtracting the start address from the end address of the part table on the management table designated by the indicating data, adding "1" and a total value of segment data to a difference value obtained at the adding steps as a new value of segment data;

comparing the link data of the part table with a predetermined identification code; and converting, when the result at the comparing step is coincidence between the link data and the predetermined identification code, the total value of segment data into time information.

4. A method according to claim 3, wherein the predetermined identification code is 00 in hexadecimal notation.

5. A reproducing and recording apparatus for reproducing recording data on a recording medium which has recorded thereon program data which is recorded as a single continuous segment or a plurality of discrete segments and a management table for managing the program data, the management table including a plurality of part tables each of which has a start address and an end address of a segment on the recording medium and link information indicative of another segment to be linked and a corresponding table, indicating data for each of the program data, indicating an absolute position of the corresponding part table, said apparatus comprising:

data read-out means for reading out the data recorded on the recording medium;

storage means for storing therein the management table data read out by said data read-out means;

calculation means for calculating, in accordance with the management table data stored in said storage means, a sum total of data lengths of segments indicated by all of those part tables successively linked in accordance with the link information beginning with the part table indicated by each of the corresponding table indicating data, adding all of the total values of data lengths calculated for the individual program data and converting the sum value obtained by the addition into time information indicative of the total time durations for all program data; and display means for displaying thereon the time information from said calculation means.

6. A reproducing and recording apparatus for reproducing and recording data on a recording medium which has a plurality of recorded and recordable areas each constituted from a single continuous segment or a plurality of discrete segments and has recorded thereon a management table including a plurality of part tables each of which has a start address and an end address of a segment on the recording medium and link information indicative of another segment to be linked and a corresponding table having data stored thereon indicating an absolute position of one of the part tables in the recordable areas on the management table, said apparatus comprising:

data read-out means for reading out the management table data on the recording medium;

storage means for storing therein the management table data read out by said read-out means;

calculation means for calculating, in accordance with the management table data stored in said storage means, a sum total of data lengths of the segments indicated by all of those part tables successively linked in accordance with the link information beginning with the part table indicated by the corresponding table indicating data and for converting the total value obtained by the calculation into time information indicative of the total time duration of all recordable segments available for recording; and display means for displaying thereon the time information from said calculation means.

7. A recordable time information calculating method for a recording medium having at least one recordable area, and a management table, the recordable area being usable to record a single continuous segment or a plurality of separated segments, the management table including a plurality of part tables and data indicating absolute address data of the head part table in the plurality of part tables, the plurality of part tables, the plurality of part tables having start address data of the segment, end address data of the segment and link data indicating the next segment which is linked to precedent segment, the method comprising the steps of:

subtracting the start address from the end address of the part table on the management table designated by the indicating data;

adding "1" and a total value of segment data to a difference value obtained at the adding steps as a new value of segment data;

comparing the link data of the part table with a predetermined identification code; and converting, when the result at the comparing step is coincidence between the link data and the predetermined identification code, the total value of segment data into time information onto the recording medium, and displays the result of the calculation.

8. (Amended) A method according to claim 7, wherein the predetermined identification code is 00 in hexadecimal notation.

9. A reproducing and recording apparatus for reproducing and recording a recording medium which has at least one recorded area and a plurality of recordable areas upon which either a single continuous segment or a plurality of discrete segments has recorded thereon a management table for management of the segments of the recorded and the recordable areas, wherein the management table includes a plurality of part tables each of which has a start address and an end address of a segment on the recording medium and link information indicative of another segment to be linked and part table indicating data for the recording area corresponding to the recordable area or and the unused part table indicating absolute positions of the part tables on the management table, said apparatus comprising:

data read-out means for reading out the management table data on the recording medium;

storage means for storing therein the management table data read out by said read-out means;

calculation means for counting, in accordance with the management table data stored in said storage means, the number of all of those part tables successively linked in accordance with the link information individually beginning with the part tables indicated by the data stored in a corresponding table for the unused part table to indicate the number of segments which are available for recording; and display means for displaying thereon the number of available segments for recording from said calculation means.

10. A reproducing and recording apparatus according to claim 9, wherein said calculation means includes:

means for comparing the part table indicating data with a predetermined identification code; and means for counting the number of part tables until the result at the comparing step reveals coincidence.

11. A reproducing and/or recording apparatus according to claim 10, wherein the predetermined identification code is 00 in hexadecimal notation.

* * * * *